US012773678B2

(12) United States Patent
Sarswat et al.

(10) Patent No.: US 12,773,678 B2
(45) Date of Patent: Oct. 27, 2026

(54) SELECTIVE APPROACH TO SEPARATE AND CONCENTRATE RARE EARTH ELEMENTS

(71) Applicant: UNIVERSITY OF UTAH RESEARCH FOUNDATION, Salt Lake City, UT (US)

(72) Inventors: Prashant K. Sarswat, Salt Lake City, UT (US); Joel K. Ilunga, Salt Lake City, UT (US); Michael L. Free, Salt Lake City, UT (US); Yogendra K. Mishra, Sønderborg (DK)

(73) Assignee: University of Utah Research Foundation, Salt Lake City, UT (US)

( * ) Notice: Subject to any disclaimer, the term of this patent is extended or adjusted under 35 U.S.C. 154(b) by 520 days.

(21) Appl. No.: 18/323,996

(22) Filed: May 25, 2023

(65) Prior Publication Data

US 2023/0381741 A1 Nov. 30, 2023

Related U.S. Application Data

(60) Provisional application No. 63/346,730, filed on May 27, 2022.

(51) Int. Cl.
*C07F 3/06* (2006.01)
*B01D 15/08* (2006.01)
(Continued)

(52) U.S. Cl.
CPC ............ *B01J 20/226* (2013.01); *B01D 15/08* (2013.01); *B01J 20/282* (2013.01);
(Continued)

(58) Field of Classification Search
CPC .... B01J 20/226; B01J 20/282; B01J 20/3078; B01J 20/3085; B01J 2220/52; B01J 20/06;
(Continued)

(56) References Cited

U.S. PATENT DOCUMENTS 5,882,529 A 3/1999 Gupta
6,106,715 A 8/2000 Thalmann et al.
(Continued)

FOREIGN PATENT DOCUMENTS

AU 2015309291 A1 * 3/2017 ................ C02F 1/28
CA 3115550 A1 * 4/2020 ............ H01M 4/587
(Continued)

OTHER PUBLICATIONS

Advanced Google Scholar Search: terms "tetrapod, zinc oxide or ZnO, rare earth" (Year: 2026).*
(Continued)

*Primary Examiner* — Joseph W Drodge
(74) *Attorney, Agent, or Firm* — Workman Nydegger

(57) ABSTRACT

Preparation and use of specialized nanoparticles containing tetrapods/graphene/metal organic frameworks, which are very effective at separating rare earth elements. Such methods and systems can be used for separating neodymium (Nd), Dysprosium (Dy), Praseodymium (Pr) and other REEs. Such metal organic frameworks may also be useful for separating other metals (e.g., so called critical metals). The metal organic framework (MOF) material is synthesized by solid phase reaction of metal oxide (e.g., ZnO) tetrapod or other nanostructured metal oxides, which are functionalized with nanoplatelet graphene, and a polyfunctional organic acid (e.g., an aromatic polycarboxylic acid). Such a resulting metallic organic framework exhibits high selectivity towards light REEs (e.g., Nd and Py), with lower selectively towards heavy REEs (e.g., Dy), allowing separation of such from one another.

11 Claims, 7 Drawing Sheets

(51) Int. Cl.

| | |
|---|---|
| ***B01J 20/22*** | (2006.01) |
| ***B01J 20/282*** | (2006.01) |
| ***B01J 20/30*** | (2006.01) |
| ***C22B 59/00*** | (2006.01) |

(52) U.S. Cl.
CPC ....... *B01J 20/3078* (2013.01); *B01J 20/3085* (2013.01); *C07F 3/06* (2013.01); *C22B 59/00* (2013.01); *B01J 2220/52* (2013.01)

(58) Field of Classification Search
CPC .... B01J 20/3071; B01J 20/3204; B01J 20/20; B01J 20/223; B01J 20/3206; B01J 20/3234; B01J 20/3242; B01J 20/3289; B01D 15/08; C07F 3/06; C22B 59/00; Y02P 10/20; C01B 32/182; C07C 51/418; C02F 1/281; C02F 1/285; C02F 1/288; C02F 2010/20
See application file for complete search history.

(56) References Cited

U.S. PATENT DOCUMENTS

| | | | | |
|---|---|---|---|---|
| 11,008,347 | B2 | 5/2021 | Ohashi | |
| 2008/0003142 | A1 | 1/2008 | Link et al. | |
| 2009/0014360 | A1 | 1/2009 | Toner et al. | |
| 2011/0096327 | A1 | 4/2011 | Papautsky et al. | |
| 2019/0169036 | A1 * | 6/2019 | Minguez .............. | B01J 20/3265 |
| 2024/0052457 | A1 | 2/2024 | Free et al. | |

FOREIGN PATENT DOCUMENTS

| | | | |
|---|---|---|---|
| CN | 113817116 | A | 12/2021 |
| EP | 4095097 | A1 | 11/2022 |
| WO | 2021/148700 | A1 | 7/2021 |

OTHER PUBLICATIONS

Asadollahzadeh et al., "Extraction and separation of rare earth elements by adsorption approaches: Current status and future trends," Separation & Purification Reviews, vol. 50, Issue 4, 2021, pp. 417-444.

Baghayeri et al., "Application of graphene/zinc-based metal-organic framework nanocomposite for electrochemical sensing of As (III) in water resources," Analytica chimica acta, vol. 1099, 2020, pp. 60-67.

Barrak et al., "Highly efficient extraction of rare earth elements and others ions from green phosphoric acid medium using TMSEDTA@GO@Fe3O4 core-shell", Separation and Purification Technology, vol. 222, Apr. 4, 2019, pp. 145-151.

Chen et al., "Selective Adsorption of Rare Earth Elements by Zn-BDC MOF/Graphene Oxide Nanocomposites Synthesized via In Situ Interlayer-Confined Strategy," Industrial & Engineering Chemistry Research, vol. 61, Issue 4, 2022, pp. 1841-1849.

De Farias et al., "Cerium recovery from aqueous solutions by bio/adsorption: A review in a circular economy context", Journal of Cleaner Production, vol. 326, 2021, 129395.

International Search Report and Written Opinion for Application PCT/US2023/023768, dated Sep. 20, 2023, 18 pages.

Mishra et al., "ZnO tetrapod materials for functional applications", Materials Today vol. 21, No. 6, Jul.-Aug. 2018, pp. 631-651.

Nwe T.S., "Synthesis and Photocatalytic Activities of Dy-doped TiO2 Nanoparticles Hybrid with TiO2 (B) Nanobelts and Reduced Graphene Oxide", 2019, pp. 131.

Wu et al., "Highly Selective Separation of Rare Earth Elements by Zn-BTC Metal-Organic Framework/Nanoporous Graphene via In Situ Green Synthesis", Anal Chem., May 15, 2021, vol. 93, No. 3, pp. 1732-1739.

Non-Final Office Action received for U.S. Appl. No. 18/447,171, mailed on Apr. 21, 2026, 10 pages.

* cited by examiner

FIG. 1A FIG. 1C FIG. 1E
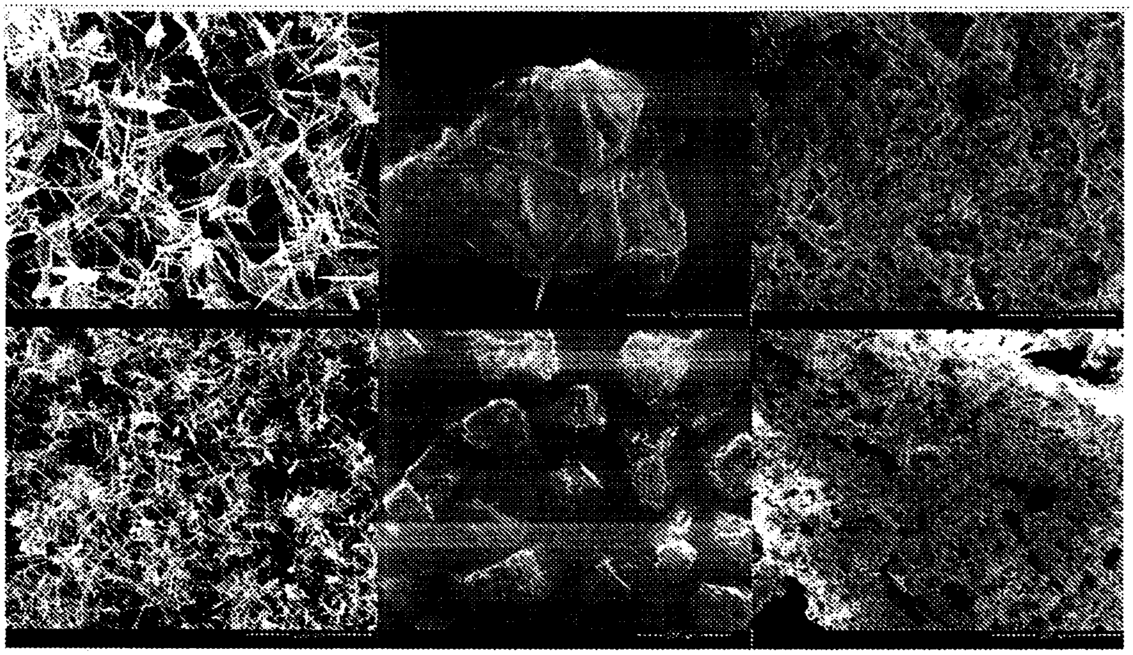
FIG. 1B FIG. 1D FIG. 1F
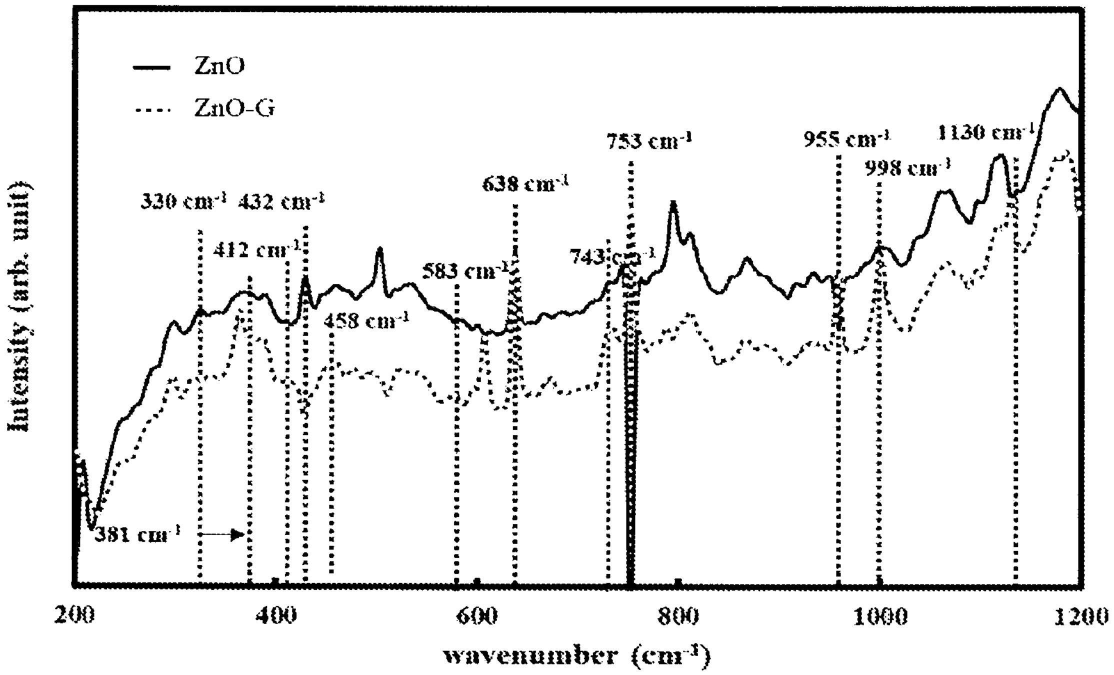
FIG. 2

SELECTIVE APPROACH TO SEPARATE AND CONCENTRATE RARE EARTH ELEMENTS

CROSS-REFERENCE TO RELATED APPLICATIONS

The present application claims the benefit under 35 U.S.C. 119(e) of U.S. Application No. 63/346,730, filed May 27, 2022, entitled SELECTIVE APPROACH TO SEPARATE AND CONCENTRATE RARE EARTH ELEMENTS, which is herein incorporated by reference in its entirety.

STATEMENT AS TO FEDERALLY-SPONSORED RESEARCH

N/A.

FIELD OF THE INVENTION

The present invention generally relates to separation and concentration of rare earth elements (REEs) and/or so called "critical metals", e.g., as identified and published by the US Geological Survey.

BACKGROUND

REEs are grouped under lanthanides in the periodic table, from lanthanum to lutetium, including scandium and yttrium. They are typically classified into light REEs (LREEs) and heavy REEs (HREEs), based on different physical and chemical properties. LREEs include lanthanum, cerium, praseodymium neodymium, promethium, europium, and scandium. HREEs include gadolinium, terbium, dysprosium, holmium, erbium, thulium, tyyerbium, lutetium, and yttrium. REEs have experienced an increase in demand due to their use in many areas of technology. Such materials are now considered to be critical materials in need of more sustainable production methods in their pure state. Conventional methods of separation and purification are relatively inefficient, pose environmental concerns, and tend to be lengthy, complex, and energy intensive.

For example, current methods for extraction, separation, and recovery of REEs include solvent extraction (SE.) or liquid-liquid extraction (LLE), adsorption or solid-liquid extraction (SLE), precipitation, ion-exchange, membrane processes, and electrodeposition. LLE has been the widely used method of separating REEs into individual REE elements, which is essentially a multistage process that includes loading the solute (REEs) from an aqueous phase onto an organic phase and then stripping them back into an aqueous phase. However, LLE has its own drawbacks including length of the process, multi-stage complexity, and high generation of waste, which makes it relatively inefficient and not particularly environmentally friendly. Electrodeposition has been traditionally used for recovering pure REE metal out of solution. This process is typically done using molten salts at temperatures exceeding 500° C. Such processes are energy intensive and highly corrosive. There is a need for improved separation technologies in order to meet the current demand for REEs and other critical metals.

SUMMARY

An aspect of the present invention is directed to use of specialized metal oxide tetrapods nanoparticles or other nanostructured metal oxides (including mixed metal oxides) which have been functionalized with a 2D material (e.g., nanoplatelet graphene, reduced graphene oxide, a transition metal dichalcogenide, or black phosphorus), so as to form a functionalized metal organic framework (MOF). In an embodiment, the MOF is further functionalized with a polyfunctional organic acid (e.g., a polyfunctional aromatic organic acid). Addition of aluminosilicate particles (e.g., kaolinite clays) or other components may be added to enhance selectivity for specific REEs, or other target metals.

The metal oxide, or mixed metal oxides specialized nanostructures provide an interweaved structure that provides user defined functionalities to capture one or more specific REEs within their mesh structure. Various changes such as addition of two or more metals during creation of mixed metal oxides result in unique type mesoporous materials. Other variations such as changes in temperature and processing time results in different types of arm length of tetrapods so as to form different pore sizes and pore volumes, which can allow tuning of selectivity to various REEs or other metals, for their efficient separation. While REEs will be principally described herein, it will be appreciated that the present embodiments may also be suitable for similar separations with other metals (e.g., critical metals). Such MOFs, can be very effective at separating REEs, or classes of different REEs from one another. For example, such materials can be used for separating neodymium (Nd), dysprosium (Dy), praseodymium (Pr), and other REEs from one another. It is important to note that the nanostructure shape variation of the particularly formed MOF can be varied or achieved by changing processing parameters (i.e. variation of the identify, and/or ratio of different metals or metal oxides, processing times, reaction temperatures, etc.). Such differences can result in different selectively relative to any of various REEs or critical metals to be separated or concentrated.

While some MOFs are already described in the literature, Applicant has created MOFs with novel specialized nanostructures, and a particular interweaving pattern, based on the use of tetrapods to form a novel backbone for the MOF, which structure allows specific REEs to be adsorbed on specific adsorption sites. Such structures are used to create the presently described MOFs. Further modifications in the nanostructure skeleton (based on use of tetrapods) can be done by addition of perovskites or other compounds with spinodal type structures.

According to an aspect and exemplary embodiment, a metal organic framework (MOF) material is synthesized by using simple synthesized ZnO tetrapods as a base or backbone, followed by solid phase reaction (optionally with other nanostructured metal oxides) with nanoplatelet graphene (NG), and a polyfunctional organic acid (e.g., an aromatic polycarboxylic acid) such as trimesic acid to further functionalize such structures. Such a resulting metal organic framework exhibits high selectively towards light REEs, with lower selectively towards heavy REEs, allowing separation of such species from one another. As noted, light REEs include lanthanum, cerium, praseodymium, neodymium, promethium, europium, and scandium, whereas the heavy REEs include gadolinium, terbium, dysprosium, holmium, erbium, thulium, ytterbium, lutetium, and yttrium. As noted, such MOFs may potentially be used to separate other metals, as well.

An advantage associated with use of a tetrapod form of the metal oxide, particularly a tetrapod ZnO material as compared to use of a ZnO having a different shaped structure is that the resulting tetrapod nanoparticles include a spatial distribution where the tetrapod legs of the ZnO or other tetrapod cause it to self-orient on the surface of a given substrate with one of its arms positioned normal to the substrate surface. Such a characteristic is believed to aid in the ability of the tetrapod nanoparticles based metal organic frameworks as described herein to achieve more efficient separation of desired target REEs.

A mesoporous template according to the present invention can be prepared via a simple "green" synthesis between the ZnO tetrapod or other metal oxide nanoparticle material and the nanoplatelet graphene (or another 2D coating material). Further functionalization can occur through a solid-phase reaction of such product with a polyfunctional, aromatic organic acid such as trimesic acid.

In an embodiment, the tetrapod ZnO or other metal oxide is first formed through a simple single step flame transport synthesis step, for example, using a combination (e.g., 2:1) of a sacrificial polymer solvent such as poly (vinyl butyral) (PVB) and zinc or other metal or metal oxide microparticles. Such can be performed in any suitable furnace (e.g., a basic muffle-type furnace), at elevated temperature (e.g., at least 850° C., for example 900° C. to 1100° C., such as 900° C., or 950° C.). The duration of such a flame synthesis step may be at least 20 minutes, for example 30-120 minutes, such as 30, or 90 minutes). A preheating step, at about 450° C., before flame transport synthesis, can be important to ensuring that the desired structure is formed. After such preheating, a crucible with the sacrificial polymer solvent and the metal nanoparticles is placed within the furnace. The flame created through combustion of the sacrificial polymer solvent carries the Zn or other metal microparticles upward, where they are transformed into ZnO or other metal oxide nano or microstructures due to the high flame temperature. The flame and the sacrificial polymer (e.g., PVB) control how much oxygen gas is needed for the flame transport synthesis process.

Such a process can be used for forming the tetrapods as free powder, which can subsequently be used to produce the MOFs described herein. In the present invention, such tetrapod power is used as a base or backbone to develop advanced carbon-based MOFs via solid state reaction of such tetrapod powder(s) and carbon.

In an embodiment, whole mesoporous structures can be used as is, or may be used incorporated into another material or matrix, e.g., in a protected manner such as filling of such compounds in a degradable capsule shell (e.g., to avoid the loss of compound) or protection with other porous paper or other material, or use of other acrylic or plastic/polymeric media to make a robust material for use in separating REEs or other metals. Such a robust material can also be used, e.g., like a syringe filter type material, that will only allow specific ions to pass. A combination of two or more such metal oxide based materials would allow for further, or specific enrichment. For example, such materials could be mixed together within the robust material matrix, or could be presented in series, e.g., to achieve removal of one metallic species within a first portion, and another metallic species within another portion of such a device including the robust materials.

The shape of the resulting tetrapods may vary in a controllable fashion depending on reaction time, temperature, or other factors, from generally uniformly shaped tetrapod arms to sharp needle-type arms (where more than 4 needle-type arms may form), and finally to a self-assembled interconnected macroscopic network of tetrapods. In order to form appropriate adsorbing media for specific REEs, temperature, reaction time, and other inputs may be varied during the process. For example, metals other than Zn can be used. Core-spike micro or nano-sea-urchin type structures can be produced using FeO based nanostructures. Using the described flame transport synthesis approach, other variations in microstructures are possible. Various metals that may be used include, but are not limited to Zn, Fe, Sn, Bi, Al, and/or Si. Other metals will be apparent to those of skill in the art, in light of the present disclosure. Such materials may be selected to have average nanoparticle sizes of from about 3 μm to about 45 μm, prior to the flame transport synthesis step. Ethyl cellulose, PVB and/or other similar sacrificial solvents or mixtures of solvents can be used to produce nanoparticles of different shapes, and having different characteristics.

Hybrid structures are also possible, where a mixture of two or more different metals or metal oxides are used. Such specialized nanoparticles can be grown in or on a variety of substrates as well. Continuous growth using flame transport synthesis methods result in a network of such nanocrystals. A network with tunable adsorption capability can therefore be created using such methods (e.g., use of different metal oxide nanoparticles, use of various functionalizing agents, etc.).

Such networks of nanocrystals can be functionalized using any of various 2D materials, such as graphene (e.g., nanoplatelet graphene), reduced graphene oxide (rGO), black phosphorus, various transition metal dichalcogenides, etc.). Addition of kaolinite clay (or similar aluminum silicate) particles, perovskites, or other spinodal materials can be advantageous in enhancing selectivity for specific REEs.

By way of example, exemplary hybrids may include, but are not limited to an FeO—ZnO hybrid nanocrystalline structure or a BiO—ZnO hybrid nanocrystalline structure. ZnO structures may vary, depending on synthesis temperature and reaction time, e.g., from a tetrapod structure, to a structure exhibiting significantly more needle-type arms (e.g., more than 4 arms relative to the typical tetrapod structure). For example, such a needle-type structure with additional arms may occur at higher synthesis temperatures.

A typical exemplary synthesis procedure may include mixing nanocrystals with nanographene or a similar 2D coating material in solution, which is mixed for about 10 minutes (e.g., 5-20 minutes). The mixture may then be filtered using filter paper, with the solids being dried overnight, e.g., at 55° C. Once dried, the metal oxide nanostructure can be burned one or multiple times in a mixture of acetone and ethanol fire. The burned product is then mixed or ground with an aromatic carboxylic acid (e.g., trimesic acid), and left to react under a solid-phase reaction at 100° C. (e.g., 80-150° C.) for 24 hours (e.g., 10 hours-3 days). After the reaction is completed, the mixture is washed with ethanol, and allowed to dry (e.g., at 50° C.) for another 24 hours.

Exemplary synthesized materials exhibit high selectivity relative to light REEs, as compared to heavy REEs. Such selectively and adsorption is dependent on pH, and temperature, such that these characteristics can be selected or manipulated to achieve the desired separation between various REEs. Due to relatively lower adsorption at higher temperatures, adsorbed REEs can be stripped from the functionalized ZnO-T metal organic framework by simply manipulating temperature, without requiring the use of concentrated acids for stripping.

Such separation methods may include allowing contact (e.g., with shaking) between the MOF material and a solution or other composition including the REE or other metals to be separated or concentrated, to occur for an extended period of time. For example, contact may be for at least 15 minutes, at least 30 minutes, or at least 60 minutes, no greater than 4 hours, or no greater than 3 hours, such as from 30 minutes to 3 hours or from 60 minutes to 3 hours, or from 90 minutes to 3 hours.

Such separation may be performed at an acidic pH, e.g., a pH of less than 4. In an embodiment, pH may be greater than 1.5, or greater than 2, e.g., at about a pH of 3 (e.g., pH of 2-4, or 2.5 to 3.5).

Such separation may advantageously be performed at relatively low temperatures, such as less than 45° C., less than 40° C., or less than 35° C., such as from 15° C. to 30° C., or 20° C. to 30° C. (e.g., performed at ambient temperature, without any required heating or cooling). Subsequent stripping may be achieved through a simple heating step, forcing the adsorbed REEs or other target metals out of the MOFs, into solution. For example, such stripping temperatures may be less than 100° C., less than 80° C., less than 70° C., less than 60° C., or less than 50° C. (e.g., from 35° C. or 40° C. to 50° C. or 60° C.). The ability to achieve stripping with heating, rather than use of concentrated acid, is advantageous.

Features from any of the disclosed embodiments may be used in combination with one another, without limitation. This summary is provided to introduce a selection of concepts in a simplified form that are further described below in the detailed description. This summary is not necessarily intended to identify key or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the components and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

FIGS. 1A-1B show SEM images of ZnO tetrapods.

FIGS. 1C-1D show SEM images of ZnO-G (zinc oxide tetrapods treated with graphene) before REE adsorption.

FIGS. 1E-1F show ZnO-G after REE adsorption.

FIG. 2 shows Raman spectra of both ZnO tetrapods and ZnO-G before REE adsorption.

DETAILED DESCRIPTION

I. Introduction

Figure 3:
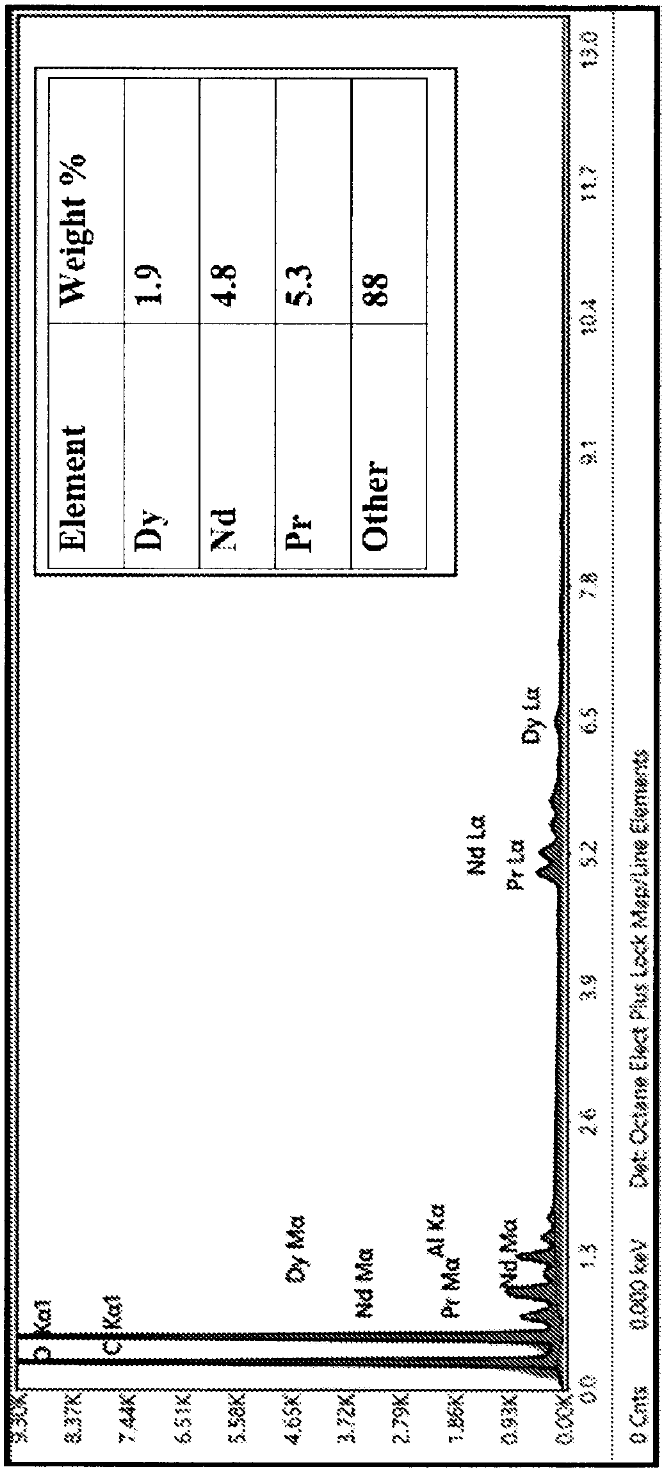
FIG. 3 shows EDS results for ZnO-G after REE adsorption.

The present disclosure is directed to methods for preparing a functionalized metal organic framework for use in concentrating and/or separating rare earth elements (REEs) or other metals, as well as methods of such separation, and functionalized metal organic framework materials that can be used for such concentration and/or separation.

An exemplary method of preparation includes mixing a metal oxide tetrapod or other nanostructured metal oxide, e.g., formed in a simple flame transport synthesis step, with a solution including nanoplatelet graphene or a similar 2D coating material, and burning the material (e.g., in acetone and/or ethanol fire) resulting from such mixture. The burned material can then be mixed with a polyfunctional organic acid, where a reaction (e.g., solid-phase reaction) is allowed to occur, to produce the desired functionalized metal organic framework that can be used for REE separation and/or concentration. The metal or metal oxide tetrapod or other nano structured metal oxide base or backbone material can be formed in a simple flame transport synthesis step by combining the metal nanoparticles with a sacrificial polymer solvent such as poly (vinyl butyral) (PVB), ethyl cellulose, or similar sacrificial polymer solvent.

An exemplary functionalized metal organic framework includes a metal oxide tetrapod or similar nanostructured metal oxide material, where the tetrapod or similar nanostructured metal oxide material is functionalized with nanoplatelet graphene or similar 2D coating, where the tetrapod or other nanostructured metal oxide material is also functionalized with a polyfunctional organic acid.

Such materials may include more than one metal oxide (e.g., tetrapod ZnO mixed with another metal oxide) to provide particular functionality, and/or another material may be mixed therewith (e.g., aluminum silicate clays, perovskites, or other spinodal structured materials). Such variations may allow tuning of the selectivity of the produced MOF. Such MOFs can also be incorporated into another media material, to provide a robust structure, e.g., within a acrylic or other polymeric matrix, e.g., positioned within a filtering syringe, chromatography media, or the like. A solution or other composition including REEs or other metals to be separated can be passed through such a robust material, to separate and/or concentrate REEs or other metals from one another, as they pass through such a material.

Exemplary methods of use may include using such a modified tetrapod metal organic framework for selective absorption of REEs. Such methods of use may include selective adsorption of metal ions (e.g., REE metal ions), or exclusion of desired target metal ions (e.g., REE metal ions) from passing through a membrane material that includes such a modified tetrapod/nanostructured metal organic framework material. Another exemplary method of use may include use in a chromatography application. Another exemplary method of use may include use of such a material in a modified functionally graded or multilayered adsorption matrix of a porous electrode structure, to selectively adsorb and/or exclude target metal ions (e.g., REE metal ions) relative to other metal ions (e.g., other REE metal ions). Within any such methods, one or more of pH, exchange ion concentration, or temperature may be manipulated, in order to more effectively and selectively load or strip desired target metal ions.

II. Exemplary Methods and Materials

An exemplary method for preparing a functionalized metal organic framework for use in concentrating and/or separating REEs includes: (a) providing a metal oxide tetrapod or other nanostructured metal oxide; (b) mixing a metal oxide tetrapod (e.g., tetrapod ZnO) or other nanostructured metal oxide material with a solution including nanoplatelet graphene or another 2D coating (e.g., graphene, reduced graphene oxide, a transition metal dichalcogenide, or black phosphorus); (c) burning the material resulting from (b); and (d) mixing the burned material from (c) with a polyfunctional organic acid, and allowing a reaction (e.g., solid-phase reaction) therebetween to occur, to produce the functionalized metal organic framework.

The metal oxide tetrapod or other nanostructured material used as a base or backbone for the MOF may itself be formed in a simple single step flame transport synthesis process, where a sacrificial polymer solvent (e.g., a resin) such as poly (vinyl butyral) is mixed with metal microparticles. Another exemplary sacrificial polymer solvent may include ethyl cellulose. Others will be apparent to those of ordinary skill in the art, in light of the present disclosure, and are contemplated for use herein. Any of a variety of metal particles may be used, e.g., such as Zn, Fe, Sn, Bi, Al, and/or Si. Such particles may be micron sized, e.g., ranging in size from 3 μm to 45 μm. Zn is a particularly suitable material. In an embodiment where two or more such metal particles are used, at least one of the metal particles may comprise Zn (e.g., Zn+Fe, Zn+Sn, Zn+Bi, Zn+Al, or Zn+Si). The metal particles may be mixed with the sacrificial polymer solvent in any suitable ratio, such as from 1:5 to 5:1. In an exemplary embodiment, the ratio may include 2 parts PVB to 1 part zinc or other metal particles.

The furnace within which the flame transport synthesis process is carried out may be preheated to at least 400° C., at least 425° C., or at least 450° C. After preheating, a ceramic crucible with the PVB or other sacrificial polymer solvent and zinc or other metal particles may be placed within the furnace (e.g., a muffle-type furnace), which is then heated to a temperature of at least 800° C., at least 850° C., or at least 900° C., such as from 900° C. to 1100° C., or 900° C. to 1000° C., such as 900° C. or 950° C. The flame transport synthesis step may occur at such temperature over a period of time of at least 20 minutes, or at least 30 minutes, such as from 30 minutes to 3 hours, from 30 minutes to 2 hours, or from 30 minutes to 90 minutes. During such process, the PVB or other sacrificial polymer solvent begins to burn at the high furnace temperature, and the created flame carries the Zn or other metal microparticles upward, where they are transformed into ZnO or other metal oxide nano and/or micro-structures due to the high flame temperature. Shape of the resulting tetrapods or other micro or nanostructures depends on the temperature and other conditions within the furnace, as well as the particular metal employed. Metal oxide particles could alternatively be used, in place of metal particles, in an embodiment.

Such free powder tetrapod particles can be further treated, as will be seen, to eventually result in a self-assembled, interconnected macroscopic network of tetrapods (or other nanostructures). The specific resulting structure can depend on the conditions, and particular metal material employed. For example, at moderate temperatures, using Zn particles, ZnO tetrapods are formed. At more elevated temperatures, the same Zn particles may form a structure with additional needle-type arms (more than 4 as compared to a typical tetrapod). Use of Fe particles may result in an FeO structure including a core with spikes extending therefrom (e.g., resembling a sea-urchin). Use of Bi particles may result in a BiO structure that includes curved or bent spikes extending from a central portion of the nanostructure. Each of such differing structures may offer different selectivity characteristics when used to separate or concentrate REEs. Hybrid materials may be employed, formed using two or more such metal or metal oxide materials. For example, an exemplary hybrid may include both ZnO tetrapods and an FeO sea-urchin core/spike structure. Another exemplary hybrid may include both ZnO tetrapods and a BiO micro or nanostructure with bent or curved spikes extending from a central portion of the structure.

Once the desired metal oxide tetrapod or other micro or nanostructure is formed, this structure can then be functionalized with a nanoplatelet graphene or another 2D coating material (e.g., graphene, reduced graphene oxide, a transition metal dichalcogenide, or black phosphorus). This can be done by placing the nanocrystals formed in the flame transport synthesis step into a solution of the 2D coating material (e.g., nanoplatelet graphene). The materials can be mixed together for a suitable period of time e.g., at least 3 minutes, at least 5 minutes, or from 5 to 30 minutes, such as about 10 minutes. The material can then be filtered using filter paper, and the solids allowed to dry (e.g., overnight, at elevated temperature, such as at least 40° C., or at least 50° C., such as 55° C.). By way of example, the mass ratio of metal oxide nanocrystals to 2D coating material may be 1:1 to 50:1, such as 5:1 to 20:1, such as about 10:1. For example, 0.5 g of metal oxide nanocrystals may be placed in 10 mL of solution, including 5 g/L of nanoplatelet graphene (e.g., 0.5 g metal oxide nanocrystals and 0.05 g nanoplatelet graphene).

Once dried, the metal oxide nanostructure which has been infiltrated or coated with the 2D material is then burned one or more times, e.g., in ethanol and/or acetone fire.

Finally, the burned product can be mixed or ground with an aromatic carboxylic acid (e.g., trimesic acid), and allowed to react under a solid-phase reaction at elevated temperature (e.g., at least 80° C., at least 90° C., about 100° C., no greater than 300° C., no greater than 200° C., no greater than 150° C., or from 80° C. to 120° C.) for at least 1 hour, at least 3 hours, at least 5 hours, about 24 hours, no greater than 72 hours, no greater than 48 hours, no greater than 36 hours, or from 10 hours to 30 hours.

After reaction, the product can be washed with ethanol, and allowed to dry again.

The resulting material exhibits high selectivity relative to REEs, and depending on the particular selections made, with greater selectivity for some REEs over other REEs. Such selectively and adsorption can be dependent on pH, and temperature, such that these parameters can be selected or manipulated to achieve the desired separation between various REEs.

III. Examples and Experimental Data

An advantage that zinc oxide tetrapod structures as described, functionalized with graphene (ZnO-G) has over superficially similar appearing ZnO materials is its spatial distribution or orientation, which helps it self-orient on the surface of a substrate with one of its tetrapod arms positioned normal to the substrate surface.

Materials used for the adsorption experiments described herein are listed in Table 1.

TABLE 1

| Material | Purity | Supplier |
|---|---|---|
| Zinc Oxide tetrapods | — | — |
| Nanoplatelets Graphene | — | Alfa Aeser |
| Neodymiun (III) Nitrate Hexahydrate | 99.9% | Sigama-Aldrich |
| Dysprosium (III) Nitrate Hydrate | 99.9% | Sigama-Aldrich |
| Praseodymium (III) Nitrate Hexahydrate | 99.9% | Sigama-Aldrich |
| Nitric Acid | 69.4% | Fisher Scientific |

ZnO tetrapods can be formed using a flame transport synthesis approach. A 2:1 combination of PVB and zinc microparticles, sized from 3 μm to 45 μm are mixed together. A muffle-type furnace is preheated to 450° C., and a crucible containing the zinc microparticles and PVB is introduced into the furnace, which is then heated to 900° C. to 950° C., for 30-90 minutes, for flame transport synthesis of the ZnO tetrapod structures base or backbone structures.

After flame transport synthesis of ZnO tetrapods as described, further synthesis of the presently described product was done as follows. 0.5 g of ZnO tetrapods was placed in 10 mL of nanoplatelet graphene (NG) (5 g/L) slurry which was then mixed for 10 min. Next, the mixture was filtered using filter paper and the solids were left to dry overnight at 55° C. and treated. The final black synthesized product was characterized by SEM, and Raman Spectroscopy.

The adsorption test matrix as shown in Table 2 was used to determine the adsorption kinetics (examples A16-A20), the adsorption isotherm (examples A1-A5), the effect of pH on adsorption (examples A6-A10), and the effect of temperature on adsorption (examples A11-A16).

TABLE 2

| Example | Molar Concentration per REE Salt (mol/L) | pH | Time (min) | Temperature (° C.) |
|---|---|---|---|---|
| A1 | 0.00625 | 2 | 150 | 23 |
| A2 | 0.01250 | 2 | 150 | 23 |
| A3 | 0.01875 | 2 | 150 | 23 |
| A4 | 0.02500 | 2 | 150 | 23 |
| A5 | 0.03125 | 2 | 150 | 23 |
| A6 | 0.00625 | 1.5 | 150 | 23 |
| A7 | 0.00625 | 2.0 | 150 | 23 |
| A8 | 0.00625 | 2.5 | 150 | 23 |
| A9 | 0.00625 | 3.0 | 150 | 23 |
| A10 | 0.00625 | 3.5 | 150 | 23 |
| A11 | 0.00625 | 2.0 | 150 | 25 |

TABLE 2-continued

| Example | Molar Concentration per REE Salt (mol/L) | pH | Time (min) | Temperature (° C.) |
|---|---|---|---|---|
| A12 | 0.00625 | 2.0 | 150 | 30 |
| A13 | 0.00625 | 2.0 | 150 | 35 |
| A14 | 0.00625 | 2.0 | 150 | 40 |
| A15 | 0.00625 | 2.0 | 150 | 45 |
| A16 | 0.00625 | 2 | 5 | 23 |
| A17 | 0.00625 | 2 | 15 | 23 |
| A18 | 0.00625 | 2 NNN | 30 | 23 |
| A19 | 0.00625 | 2 | 60 | 23 |
| A20 | 0.00625 | 2 | 150 | 23 |

The nitrate salts of dysprosium, neodymium, and praseodymium listed in 1 were used. Each test was performed with 5 mL of REEs nitrates solution, 50 mg of ZnO-G, the pH was adjusted using a 2 mol/L nitric acid solution. Each test was performed on a shaker. After each test, the solids were separated from the solution using filter paper, and all samples were analyzed by inductively coupled plasma mass spectroscopy.

The materials were characterized by SEM, Energy Dispersive Spectroscopy (EDS) and Raman Spectroscopy. FIGS. 1A-1B show the SEM images of tetrahedral ZnO where the structure of the ZnO is clearly depicted as a tetrahedral shape with four legs (e.g., 22 μm to 50 μm). The structure of the synthetized MOF or ZnO-G before adsorption is depicted in FIGS. 1C-1D, which shows evidence of chunky blocks (e.g., 90 to 130 μm) representing the treated nanographene mixed with the tetrahedral ZnO sitting normal to the block's surface due to its tetrahedral spatial legs configuration. The structure of the functionalized ZnO-G after adsorption has been modified during contact with acid media as shown in FIGS. 1E-1F.

Raman spectra shown in FIG. 2 were recorded in back-scattering configuration. In those Raman measurements, the excitation wavelength was ~785 nm and the laser power was ~110 mW. The measurements were performed both for tetrahedral ZnO and tetrahedral ZnO treated with graphene (ZnO-G), before REEs adsorption. It can be seen that various peaks, e.g., ~330 $cm^{-1}$, 412 $cm^{-1}$1, 432 $cm^{-1}$, 458 $cm^{-1}$, 638 $cm^{-1}$ and 1130 $cm^{-1}$ appear in the Raman spectrum of the tetrahedral ZnO. Other less intense peaks at 381 $cm^{-1}$ (A1-TO) and 583 $cm^{-1}$ (LO) mode can be seen in this spectrum. Both E2 (high) and E1(TO) modes are visible in this spectrum. Because of the number of atoms per unit cell in wurtzite-type ZnO, there are a total of 12 phonon modes, including one longitudinal-acoustic (LA), two transverse-acoustic (TA), three longitudinal-optical (LO), and six transverse-optical (TO) branches. Because of the macroscopic electronic fields associated with the LO phonons, both A1 and E1 and symmetries are polar and divide into LO and TO components with distinct frequencies. It can be seen that high frequency E2 mode (peaks at 330 and 432 $cm^{-1}$) is clearly noticed in this spectrum. FIG. 3 shows the EDS analysis of ZnO-G after adsorption for example A12. The EDS confirms the presence of Dy, Nd, and Pr respectively as 1.9%, 4.8%, and 5.3% on a weight percentage basis. Based on these results, it is clear that this material exhibits high selectivity towards Nd and Pr versus Dy.

Figure 4:
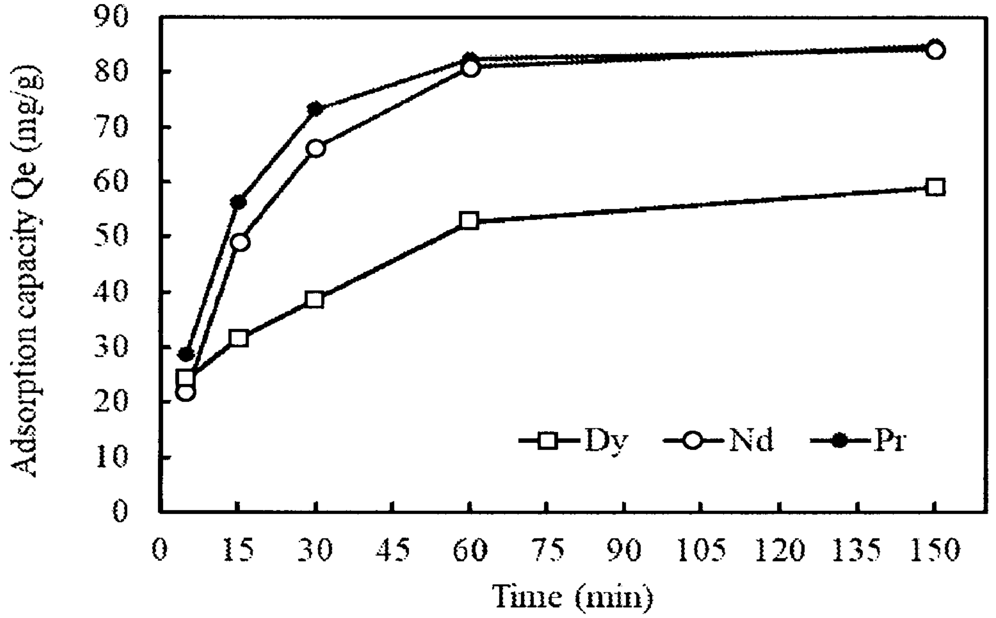
FIG. 4 shows adsorption kinetics at a pH of 2, at ambient temperature (~23° C.), and with a concentration of 0.00625 mol/L for each of the 3 REE salts.

Kinetics experiments were used to determine optimum contact time or shaking time for adsorption. It is evident in FIG. 4 that the adsorption capacity increases with increasing contact time, up to a point. After 60 min of contact time, it is evident that over 80% of the total adsorption capacity is reached and beyond that it is gradually reaching a maximum. Thus, 150 min was chosen as the contact time for subsequent experiments.

Figure 5:
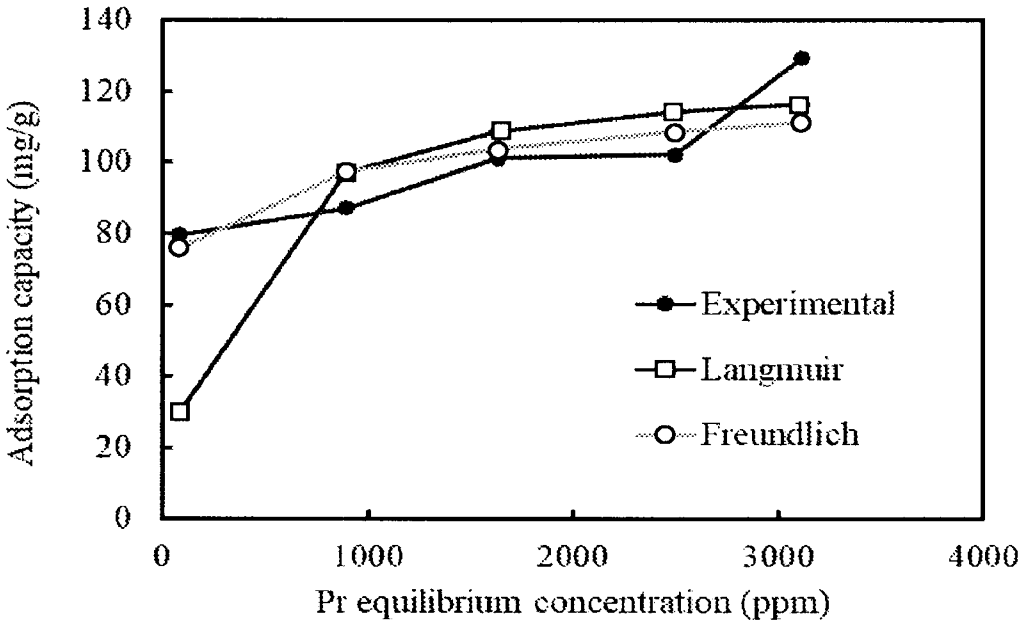
FIG. 5 shows adsorption isotherm data for praseodymium, as compared to Langmuir and Freundlich models, at a pH of 2 and at ambient temperature (~23° C.).

In order to determine the adsorption (loading or saturation) capacity of ZnO-G, adsorption isotherm experiments were performed. The results of praseodymium loading are shown in FIG. 5 which shows a jump in the loading capacity with increasing concentration, and it reached a maximum of 129 mg/g at its peak. The saturation capacity or amount adsorbed was calculated as:

$$Q_e = \frac{V(C_0 - C_e)}{W} \quad \text{(Eq. 1)}$$

Where $Q_e$ (mg/g) is the amount adsorbed, $C_o$ mg/L) and $C_e$ (mg/L) are respectively the initial and final (equilibrium) concentrations. V and W are respectively the solution volume (L) and adsorbent mass (g). Subsequently, Langmuir and Freundlich isotherm models were used to fit the experimental data. The two models are expressed as equations (Eq. 2) and (Eq. 3):

$$Q_e = \frac{K_L Q_m C_e}{1 + K_L C_e} \quad \text{(Eq. 2)}$$

$$Q_e = K_F C_e^{1/n} \quad \text{(Eq. 3)}$$

where $Q_e$ (mg/g) is the amount adsorbed, $Q_m$ (mg/g) is the maximum amount adsorbed, and $C_e$ (mg/L) is the final (equilibrium) concentration. $K_L$ is a Langmuir constant and $K_F$ and n are both Freundlich constants.

Figure 6A:
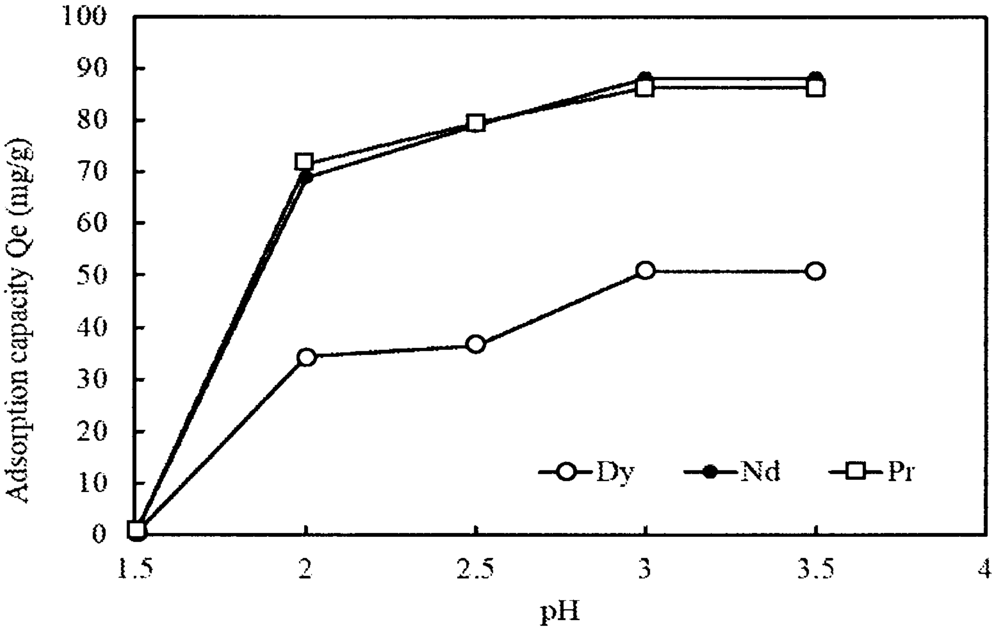
FIG. 6A shows the effect of pH on adsorption capacity Qe (mg/g).
Figure 6B:
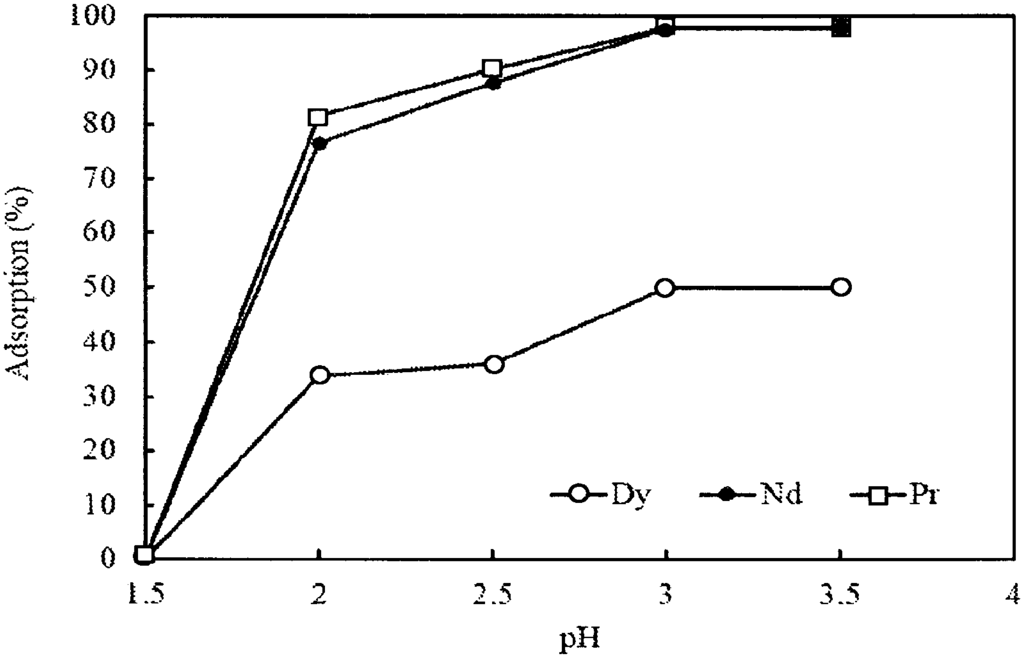
FIG. 6B shows the effect of pH on percent adsorption at ambient temperature (~23° C.) and with a concentration of 0.00625 mol/L for each of the 3 REE salts.
Figure 6C:
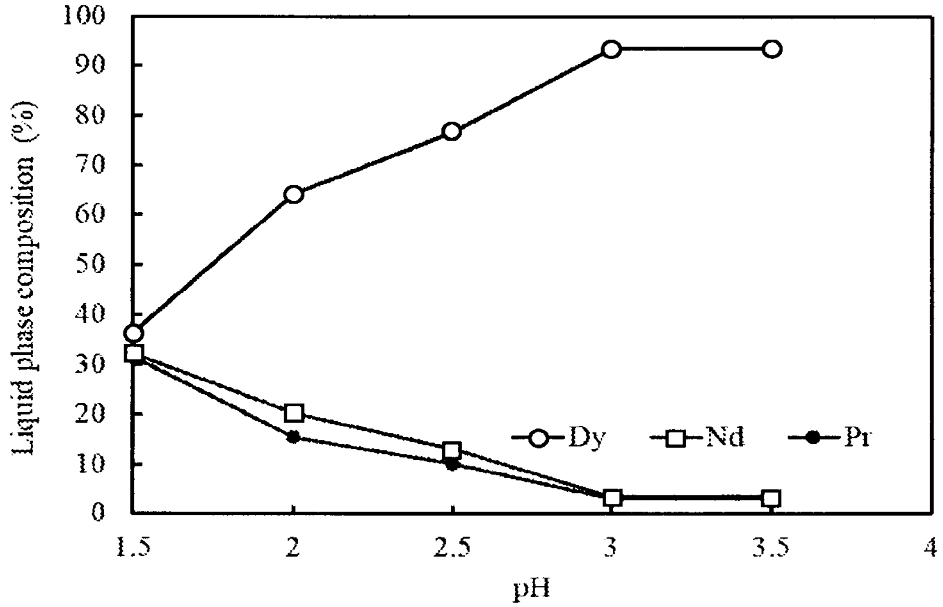
FIG. 6C shows the effect of pH on percent composition in the liquid phase, at ambient temperature (~23° C.) and with a concentration of 0.00625 mol/L for each of the 3 REE salts.

The results show that pH has a beneficial effect on adsorption as depicted in FIG. 6A, where the adsorption capacity increases with higher pH values. It is noted that a sharp increase in the adsorption capacity of Nd, Dy, and Pr occurred between a pH of about pH 1.5 and 3, particularly 1.5 and 2 (with a further increase from pH of 2 to pH of 3). Above pH 3, the capacity converges to a steady maximum value exceeding 80 mg/g for Nd and Pr, and between about 40-50 mg/g for Dy. It is evident that at a pH of 1.5 adsorption is limited as it is believed that the active adsorption sites at such acidic pH are mostly occupied by H* ions. FIG. 6B shows the adsorption of each species increasing with increasing pH. At pH 1.5, substantially 0% of REEs are adsorbed, and at pH 3 to 3.5, approximately 98% of Nd and Pr are adsorbed whereas only about 50% of Dy is adsorbed. This means that 50% of the total Dy remains in solution, representing a 93.4% enrichment relative to the 3.1% Nd and 3.5% Pr that remain in solution at pH 3 as shown in FIG. 6C. Thus, a particularly beneficial pH for the contemplated adsorption is a pH of about 3 and future tests at this pH are expected to show improved results in adsorption kinetics, isotherm, and effect of temperature.

Figure 7A:
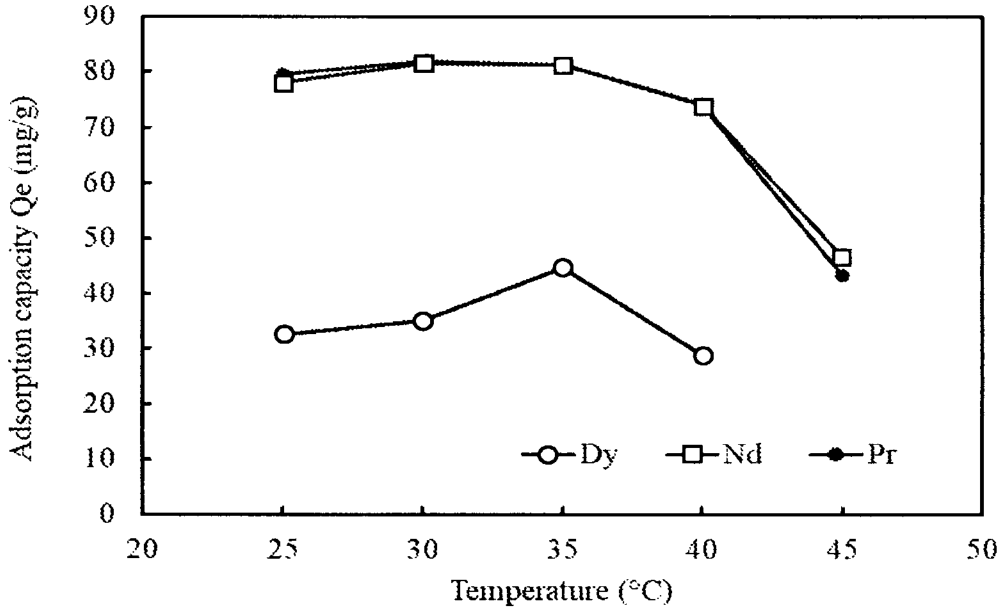
FIG. 7A shows the effect of temperature on adsorption capacity Qe (mg/g) at a pH of 2 and with a concentration of 0.00625 mol/L for each of the 3 REE salts.

The results also show that increasing temperature has a negative effect on adsorption. FIG. 7A shows evidence of a significant drop in adsorption capacity at temperatures exceeding 35° C. Such may be due to REE ions being removed from the adsorbent surface as higher temperatures tend to weaken the attractive forces between the adsorbent and adsorbate. The adsorption data shown in FIG. 7B suggests that at temperatures exceeding 35° C. (e.g., 40° C. or 45° C.), the adsorption significantly decreases by almost a factor of 2. Thus, based on these results, lower temperatures, for example 20-30° C., such as 20° C., 25° C., or 30° C. may be optimal temperatures for loading since they are associated with the lowest equilibrium concentrations for Nd and Pr. In an embodiment, loading may be performed at ambient temperature (no heating required). The fact that good adsorption can be achieved without the necessity of adding heat is of course advantageous.

Figure 8:
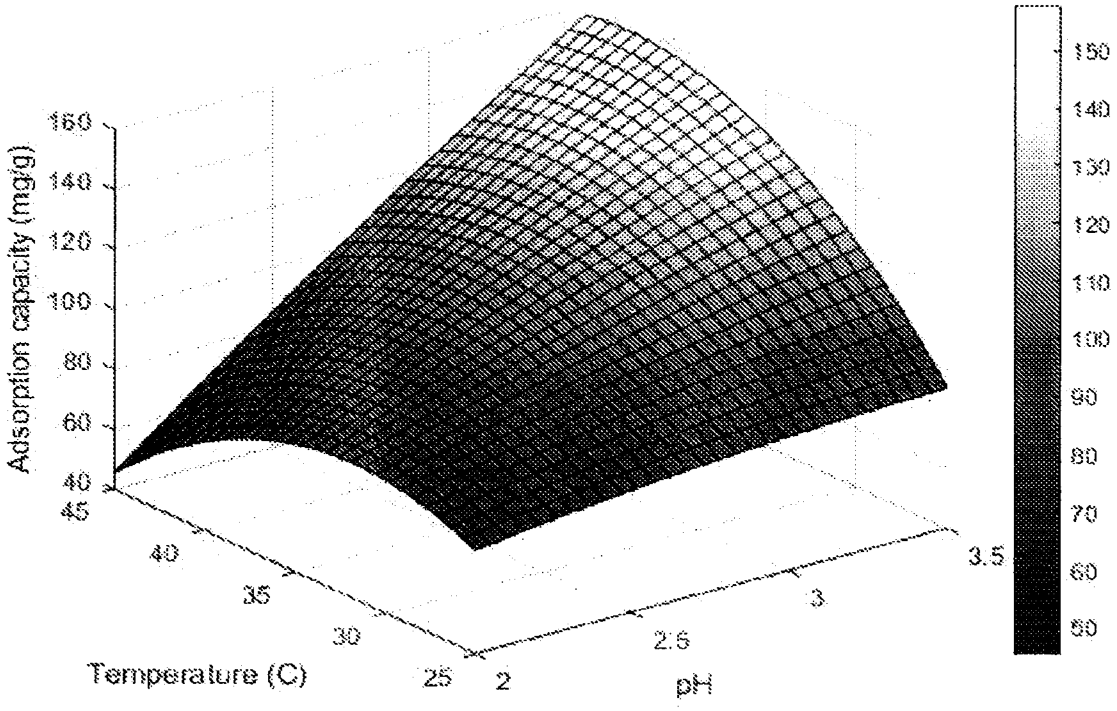
FIG. 8 shows a predicted response surface plot for the combined effect of pH and temperature on adsorption capacity Qe (mg/g) for Pr.

The combined effects of pH and temperature on adsorption were also evaluated using a quadratic two-factor surface response analysis. The results from the quadratic two-factor response surface analysis for praseodymium are shown in FIG. 8. While FIG. 8 may suggest maximum adsorption can be achieved at higher temperatures and higher pH, the actual data show optimum adsorption to be achieved at moderate temperatures, and pH values of greater than 2, greater than 2.5, or at least 3, such as from 3-4.

To determine the stripping efficiency for the fabricated material, a stripping experiment was performed on filtered solids of the 3.5 pH sample (example A10) with adsorbed REE ions in the presence of a 2 mol/L nitric acid solution. This was performed at ambient temperature (~23° C.) and was shaken for 150 min. The average stripping efficiency of Dy, Nd, and Pr achieved was 68% based on the individual efficiency shown in Table 3 and can be improved by perhaps increasing the contact time or manipulating the temperature. Furthermore, the final solution concentration after stripping is also shown in Table 3 and shows similar adsorption behavior as seen previously. The values suggest that Nd and Pr were loaded and stripped at a factor of approximately 2:1 relative to Dy.

TABLE 3

| Element | Final stripping concentration (mg/L) | Stripping Efficiency (%) |
|---|---|---|
| Dy | 330 | 65 |
| Nd | 642 | 75 |
| Pr | 529 | 63 |

In an embodiment, stripping or desorption can be achieved by manipulating temperature as shown by its effect on adsorption. Advantages of this approach include high efficiency with less acid consumption. In addition, such a process offers simple process control since the only variable is temperature. This substantially decreases operating costs, as power (to heat the solution) is cheaper and more environmentally tractable than use of concentrated acid.

Figure 7B:
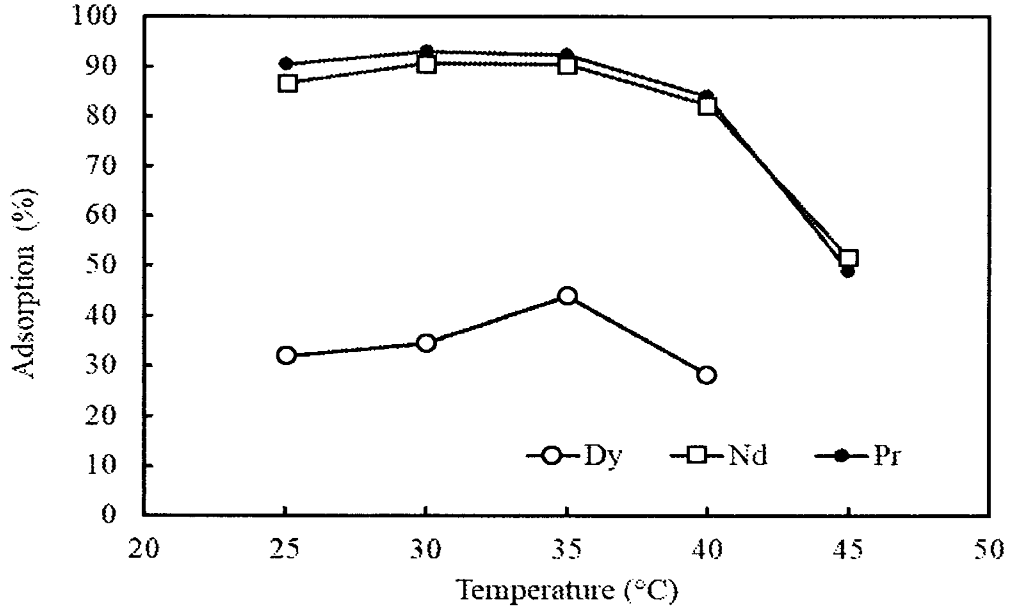
FIG. 7B shows the effect of temperature on percent adsorption at a pH of 2 and with a concentration of 0.00625 mol/L for each of the 3 REE salts.
Figure 9:
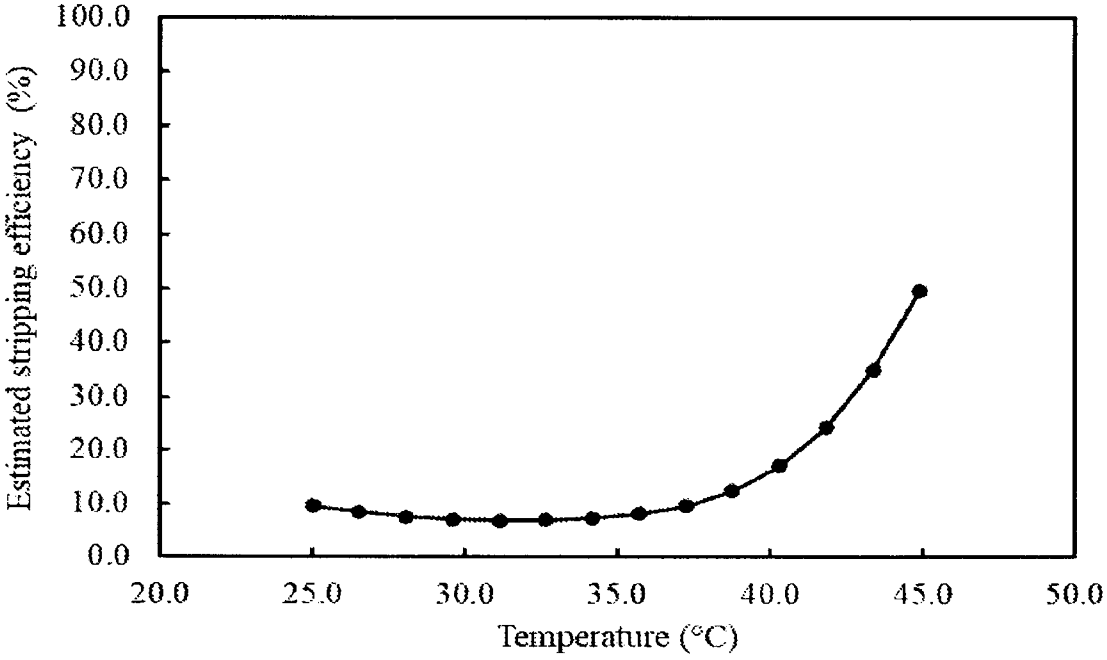
FIG. 9 shows estimated stripping efficiency based on temperature.

The adsorption data from FIG. 7B was used to estimate future stripping efficiencies based on the expected ability of temperature to desorb REEs ions from the ZnO-G pores. FIG. 9 shows that an estimated stripping efficiency of approximately 50% can be achieved at 45° C., and even higher efficiencies may be achieved at even higher temperatures.

In order to determine the degree of separation of each dissolved species in the nitrate solution using ZnO-G, selectivity was assessed based on the results of the pH and temperature experiments discussed above. One way to assess the selectivity of ZnO-G toward a single dissolved species is by calculating its distribution coefficient. The distribution coefficient ($K_d$, mL/g) of each species can be calculated as:

$$K_d = \frac{(C_0 - C_e)}{C_o} \times \frac{V}{m} \quad \text{(Eq. 5)}$$

where $C_O$ (mg/L) and $C_E$ (mg/L) are respectively the initial and final (equilibrium) concentrations. V (mL) and m (g) are respectively the solution volume and adsorbent mass. At pH 3, the $K_d$ values go up to 5142 mL/g for Pr(III) and 4695 mL/g for Nd(III) versus only 100 mL/g for Dy (III) which means that ZnO-G has a high affinity for Pr (III) and Nd (III) adsorption, since a higher $K_d$ value means higher selectivity. This allows use of the presently synthesized material for separation of Pr (III) and Nd (III) from Dy (III). Table 4 tabulates different $K_d$ values at various conditions. Since Nd and Pr are classified as light rare earth elements (LREEs) and Dy is classified as a heavy rare earth element (HREE) due to their difference in physical and chemical properties, these results show that the present ZnO-G material has a high selectivity for LREEs compared to HREEs or in other words, LREEs can be separated from HREEs using this material. As noted, alterations in selectivity can be achieved by adjusting the various parameters noted herein.

TABLE 4

| Element | $K_d$ (mL/g) | pH | Temperature (° C.) |
|---|---|---|---|
| Dy | 0 | 1.5 | 23 |
| Dy | 51 | 2 | 23 |
| Dy | 56 | 2.5 | 23 |
| Dy | 100 | 3 | 23 |
| Dy | 100 | 3.5 | 23 |
| Dy | 47 | 2 | 25 |
| Dy | 53 | 2 | 30 |
| Dy | 79 | 2 | 35 |
| Dy | 40 | 2 | 40 |
| Dy | — | 2 | 45 |
| Nd | 0 | 1.5 | 23 |
| Nd | 325 | 2 | 23 |
| Nd | 712 | 2.5 | 23 |
| Nd | 4695 | 3 | 23 |
| Nd | 4695 | 3.5 | 23 |
| Nd | 651 | 2 | 25 |
| Nd | 957 | 2 | 30 |
| Nd | 935 | 2 | 35 |
| Nd | 471 | 2 | 40 |
| Nd | 107 | 2 | 45 |
| Pr | 0 | 1.5 | 23 |
| Pr | 440 | 2 | 23 |
| Pr | 930 | 2.5 | 23 |
| Pr | 5142 | 3 | 23 |
| Pr | 5142 | 3.5 | 23 |
| Pr | 947 | 2 | 25 |
| Pr | 1344 | 2 | 30 |
| Pr | 1205 | 2 | 35 |
| Pr | 529 | 2 | 40 |
| Pr | 97 | 2 | 45 |

The potential adsorption mechanism of the synthesized ZnO-G is believed to be due to the abundance of oxygen-rich groups in the treated nanographene which is used to functionalize the tetrahedral ZnO.

REE ions enter the pores of the ZnO-G and form a stable structure in the presence of such oxygen-rich functional groups. Furthermore, the selectivity between different types of REEs is believed to arise from different binding forces that such REEs form with the oxygen-rich functional groups present in tetrahedral ZnO-G. Additionally, it is also believed that the difference in atomic radii of different REEs plays an important role as far as selectivity is concerned since such a size difference may dictate which ions can enter the ZnO-G pore.

The inventive new mesoporous template prepared via a green synthesis between tetrapod ZnO, treated with nanoplatelet graphene can be used for selective separation of REE ions. The results suggest high selectivity towards LREEs (Nd, and Pr) versus HREEs (Dy). The adsorption capacity is shown to be pH and temperature dependent. Higher adsorption (>80 mg/g for Nd and Pr) was achieved at higher pH and low adsorption at relatively higher temperatures. Due to lower adsorption at higher temperatures, it is expected that stripping can be done by manipulating temperature only, without requiring (or at least limiting) use of concentrated acids.

Unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

As used herein, the term "between" includes any referenced endpoints. For example, "between 2 and 10" includes both 2 and 10.

Unless otherwise stated, amounts listed in percentage ("%'s"), as well as ratios are by mass.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure. Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A functionalized metal organic framework for use in concentrating and/or separating rare earth elements (REEs) or other metals, comprising:

(a) a metal oxide tetrapod or other nanostructured metal oxide wherein the metal oxide tetrapod or other nanostructured metal oxide forms an interwoven backbone structure;

(b) wherein the interwoven backbone structure is functionalized with nanoplatelet graphene; and (c) wherein the interwoven backbone structure functionalized with the nanoplatelet graphene is further functionalized with a polyfunctional organic acid.

2. The functionalized metal organic framework of claim 1, wherein the metal oxide tetrapod or other nanostructured metal oxide comprises at least one of tetrapod ZnO, or tetrapod ZnO in combination with another metal oxide.

3. The functionalized metal organic framework of claim 1, wherein the metal oxide tetrapod or other nanostructured metal oxide comprises tetrapod ZnO.

4. The functionalized metal organic framework of claim 1, wherein the metal oxide tetrapod or other nanostructured metal oxide is further modified with one or more of reduced graphene oxide, a transition metal dichalcogenide, or black phosphorous.

5. A method for using a functionalized metal organic framework for selective adsorption of REEs or other metals, wherein the functionalized metal organic framework comprises:

(a) a metal oxide tetrapod or other nanostructured metal oxide forming an interwoven backbone structure;

(b) wherein the interwoven backbone structure is functionalized with nanoplatelet graphene; and (c) wherein the interwoven backbone structure functionalized with the nanoplatelet graphene is further functionalized with a polyfunctional organic acid;

the method comprising contacting the functionalized metal organic framework with a composition including two or more REEs or other metals, the functionalized metal organic framework separating one of the REEs or other metals from another one or more of the REEs or other metals.

6. The method of claim 5, wherein the functionalized metal organic framework includes a tetrapod structure, wherein an arm of the tetrapod orients itself normal to a substrate on which separation of the REEs or other metals occurs.

7. The method of claim 5, wherein the method includes selectively adsorbing metal ions of the REEs or other metals, or excluding such metal ions of the REEs or other metals from passing through a membrane material including the functionalized metal organic framework.

8. The method of claim 5, wherein the method is part of a chromatography application.

9. The method of claim 5, wherein the method includes manipulating one or more of pH, exchange ion concentration, or temperature to more effectively and selectively load or strip target metal ions of the REEs or other metals.

10. The method of claim 5, wherein the method is carried out in a modified adsorption matrix in a porous electrode structure to selectively adsorb and/or exclude target metal ions of the REEs or other metals relative to other metal ions of the REEs or other metals.

11. The method of claim 5, wherein the method is carried out in a modified functionally graded or multi-layered adsorption matrix in a porous electrode structure to selectively adsorb and/or exclude metal ions of the REEs or other metals relative to other metal ions of the REEs or other metals.

* * * * *